(12) United States Patent
MacGregor et al.

(10) Patent No.: US 7,918,461 B1
(45) Date of Patent: Apr. 5, 2011

(54) SYSTEM AND METHOD FOR FACILITATING TURBINE LABYRINTH PACKING

(75) Inventors: Donna L. MacGregor, Marion, OH (US); Thomas W. Rambin, Marion, OH (US)

(73) Assignee: Star Field Fit, Inc., Marion, OH (US)

( * ) Notice: Subject to any disclaimer, the term of this patent is extended or adjusted under 35 U.S.C. 154(b) by 308 days.

(21) Appl. No.: 11/673,814

(22) Filed: Feb. 12, 2007

Related U.S. Application Data

(60) Provisional application No. 60/773,020, filed on Feb. 14, 2006.

(51) Int. Cl.
*F16J 15/46* (2006.01)
*F16J 15/447* (2006.01)

(52) U.S. Cl. ........ 277/413; 277/416; 277/418; 277/421; 277/581; 277/583

(58) Field of Classification Search .................. 277/413, 277/581, 583, 416, 418, 421, 646
See application file for complete search history.

(56) References Cited

U.S. PATENT DOCUMENTS

| | | | | |
|---|---|---|---|---|
| 632,442 A * | 9/1899 | Byle et al. | | 277/583 |
| 943,023 A * | 12/1909 | Johnson | | 277/534 |
| 1,100,829 A * | 6/1914 | Joseph | | 138/119 |
| 1,164,303 A * | 12/1915 | Nicewarner | | 138/119 |
| 1,301,354 A * | 4/1919 | Baird | | 138/119 |
| 1,439,452 A * | 12/1922 | Shaw | | 277/646 |
| 2,401,108 A * | 5/1946 | Roberts | | 277/558 |
| 2,832,618 A * | 4/1958 | Knoll et al. | | 277/583 |
| 2,943,874 A * | 7/1960 | Valdi et al. | | 277/346 |
| 3,302,952 A * | 2/1967 | Michielin | | 277/583 |
| 3,374,806 A * | 3/1968 | Skinner | | 138/119 |
| 3,491,825 A * | 1/1970 | Matson et al. | | 164/228 |
| 3,536,559 A * | 10/1970 | Herbert et al. | | 156/429 |
| 3,642,291 A * | 2/1972 | Zeffer et al. | | 277/583 |
| 3,722,895 A * | 3/1973 | Mevissen | | 277/583 |
| 3,788,651 A * | 1/1974 | Brown et al. | | 277/646 |
| 3,856,052 A * | 12/1974 | Feucht | | 138/119 |
| 3,897,088 A * | 7/1975 | Beinhaur | | 285/97 |
| 3,999,430 A * | 12/1976 | Parduhn | | 73/146.3 |
| 4,000,759 A * | 1/1977 | Higbee | | 138/130 |
| 4,114,901 A * | 9/1978 | Pot | | 277/646 |
| 4,203,476 A * | 5/1980 | Vitellaro | | 138/122 |
| 4,241,763 A * | 12/1980 | Antal et al. | | 138/127 |
| 4,342,336 A * | 8/1982 | Satterthwaite et al. | | 138/90 |
| 4,448,425 A * | 5/1984 | von Bergen | | 277/545 |
| 4,459,168 A * | 7/1984 | Anselm | | 156/143 |
| 4,989,643 A * | 2/1991 | Walton et al. | | 138/126 |
| 5,062,456 A * | 11/1991 | Cooke et al. | | 138/125 |
| 5,344,284 A * | 9/1994 | Delvaux et al. | | 415/173.2 |
| 5,377,736 A * | 1/1995 | Stech | | 277/414 |
| 5,873,608 A * | 2/1999 | Tharp et al. | | 285/114 |
| 5,975,532 A * | 11/1999 | Karttunen et al. | | 277/300 |
| 6,105,621 A * | 8/2000 | Primich | | 138/133 |
| 6,254,732 B1* | 7/2001 | Savolainen | | 162/371 |
| 6,360,619 B1* | 3/2002 | Schultz, Jr. | | 73/863.86 |
| 6,742,545 B2* | 6/2004 | Fisher et al. | | 138/137 |
| 6,786,487 B2* | 9/2004 | Dinc et al. | | 277/355 |
| 7,147,230 B2* | 12/2006 | Rowe | | 277/583 |
| 2006/0032647 A1* | 2/2006 | Petty | | 173/169 |
| 2006/0134361 A1* | 6/2006 | Niki | | 428/36.91 |

* cited by examiner

*Primary Examiner* — Alison K Pickard
(74) *Attorney, Agent, or Firm* — Ronald J. Koch

(57) ABSTRACT a system for facilitating turbine labyrinth packing comprises: a packing holder 30, packing 20, packing teeth 21, pressurized air supply 50, hose 40, hose stabilizer 41, hose sleeve 42, pneumatic regulator 51, pressure gage 52, male quick disconnect 43, and female quick disconnect 44.

7 Claims, 3 Drawing Sheets

SYSTEM AND METHOD FOR FACILITATING TURBINE LABYRINTH PACKING

CLAIM OF PRIORITY BASED ON COPENDING PROVISIONAL APPLICATION

The present application is related to the Provisional patent application No. 60/773,020 of Donna L. MacGregor, et al, filed Feb. 14, 2006, entitled "Labyrinth Packing Installation Facilitator", and based on which priority is herewith claimed under 35 U.S.C. 119(e) and the disclosure of which is incorporated herein by reference in its entirety.

CROSS REFERENCE TO RELATED APPLICATIONS

Not Applicable

FEDERALLY SPONSORED RESEARCH

Not Applicable

SEQUENCE LISTING, TABLE, OR COMPUTER PROGRAM COMPACT DISK APPENDIX

Not Applicable

BACKGROUND AND SUMMARY

The present invention relates generally to steam turbine calibration. Specifically, the invention relates to systems and methods of calibrating packing rings which surround turbine shafts.

The present invention is a tool that has been invented in order to reduce the installation time and costs involved in fitting the packing (also called packing ring or labyrinth packing) into a packing holder (also called gland or diaphragm) in the turbine. The packing and packing holder surround, at nominal clearance, the rotor shaft of the turbine. The invention allows expedient and accurate measuring (during installation when the turbine is not operational) of the existing radial, axial and butt gap clearances for each row of labyrinth packing located throughout the turbine.

The majority of steam turbine labyrinth packing, regardless of manufacturer, requires the addition of a spring to be installed behind each packing segment. The packing segments surround the turbine rotor.

Packing segments are usually designed with integral or inserted "teeth", which can be in-line (same diameter) or hi-low (two diameters) with respect to the turbine rotor.

The purpose of the packing teeth is to create a labyrinth effect or a tortuous path to reduce steam leakage between the stationary packing and the rotating shaft. When teeth are used, grooves are machined in the rotor to accommodate the high-low teeth of the packing.

In order to further minimize shaft leakage, accurate axial alignment is critical. The installation procedure requires close radial and axial clearances to be adhered to in order to avoid tooth rubs during the operation of the turbine.

Under operating conditions, pressurized steam pushes the packing outward away from the packing holder towards the rotor. The steam is not present during downtime. Therefore, the operating conditions must be simulated during installation of the packing. In the past, this has been accomplished with springs or wedges. This has been problematic for several reasons. For instance, wedges are problematic because they are difficult to place and to insure consistent placement for each wedge.

To measure and record the amount of existing radial and axial clearances that exist between the rotor and the packing teeth at installation of the packing, it is necessary to install the packing with the springs behind the segments with the rotor in place. This is a time consuming task, requiring critical man hours to accomplish while the turbine is being reassembled. Any discrepancies found at this time can result in the rotor being removed and a possible delay in the repair time.

The invention consists of a length of flexible pneumatic tubing, sealed on one end, with an air hose connection on the other end, enclosed within a woven fabric sleeve. The tool includes a pneumatic regulator with pressure gauge, and male and female quick disconnect fittings. A male quick disconnect fitting is attached by a hose clamp to the woven fabric sleeve which contains an internal flexible metal strip. The purpose of the strip is to make the hose rigid thereby facilitating insertion into the cavity behind the packing.

The design of the invention embodies a combined system of the described parts to allow expedient and accurate measuring of the radial, axial, and butt gap clearances for each row of packing located throughout the turbine. This invention significantly reduces installation outage time and expense.

With the rotor in place and the packing installed without the springs behind the segments, the invention can easily and quickly be slipped into the packing holder, behind the packing segments. The hose is filled with and expands by pressurized air which immediately raises the packing segments to the close clearance position. Thus, the in operation condition is simulated and accurate measurements can be taken.

REFERENCE NUMERALS IN DRAWINGS

Figure 1:
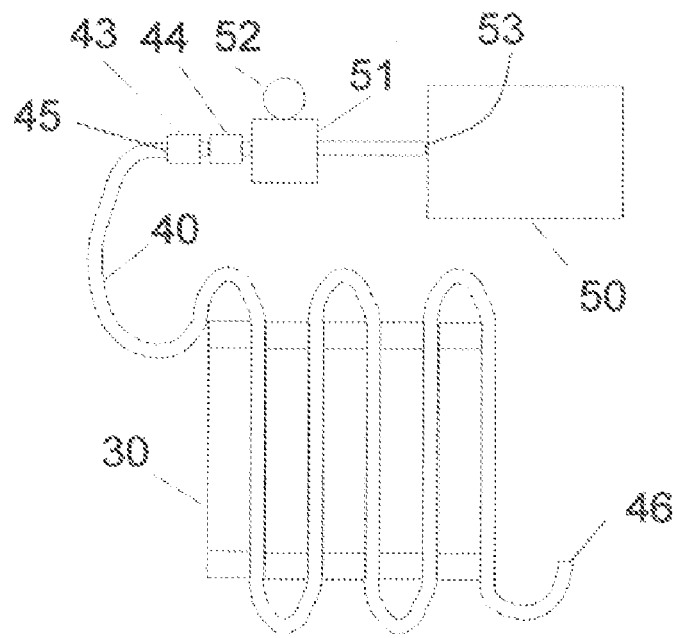
FIG. 1 Schematic of system.
Figure 2:
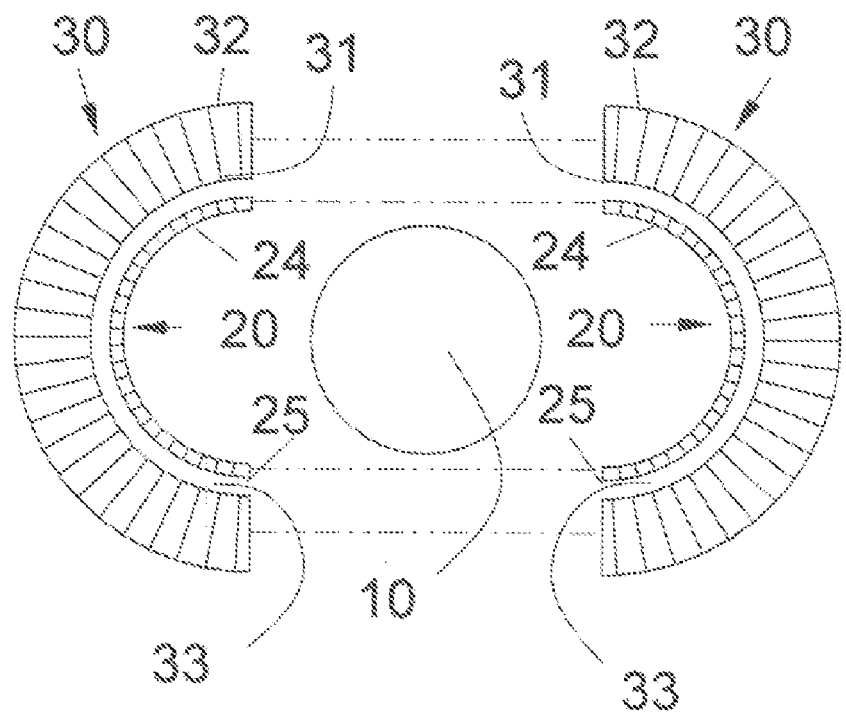
FIG. 2 Exploded, cross sectional view of segmented packing and packing holder around the turbine rotor.

The table below lists the reference numerals employed in the figures, and identifies the element designated by each numeral.

10 Rotor 10,
20 Packing 20,
21 Packing Teeth 21,
23 Arrow indicating motion of packing movement 23,
24 Inner surface of packing 24,
25 Outer surface of packing 25,
30 Packing Holder 30,
31 Inner surface of packing holder 31,
32 Outer surface of packing holder 32,
33 Channel of packing holder 33,
40 Hose 40,
41 Hose Stabilizer 41,
42 Hose Sleeve 42,
43 Male Quick Disconnect 43,
44 Female Quick Disconnect 44

45 open end of hose 45,
46 closed end of hose 46,
50 Pressurized Air Supply 50,
51 Pneumatic Regulator 51,
52 Pressure Gage 52,
53 Outlet of pressurized air supply 53,

DETAILED DESCRIPTION

Referring to FIGS. 1-6, a system for facilitating turbine labyrinth packing comprises: a packing holder 30, packing 20, packing teeth 21, pressurized air supply 50, hose 40, hose stabilizer 41, hose sleeve 42, pneumatic regulator 51, pressure gage 52, male quick disconnect 43, and female quick disconnect 44.

The packing holder 30 is annular, and has outer 32 and inner 31 surfaces, has a channel 33 adjacent the inner surface 31, and is comprised of segmented portions. The packing holder 30 can be segmented into two or more portions. It is understood that the segmenting of the packing may or may not correspond to the segmenting of the packing holder. For example, the packing holder may have only two segments whereas the packing may have 4 segments total and 2 for each packing holder segment.

In operation, the packing holder 30, with packing 20 in place, surrounds the rotor 10. During downtime, the packing holder is segmented to allow for removal and insertion of packing 20.

Figure 3:
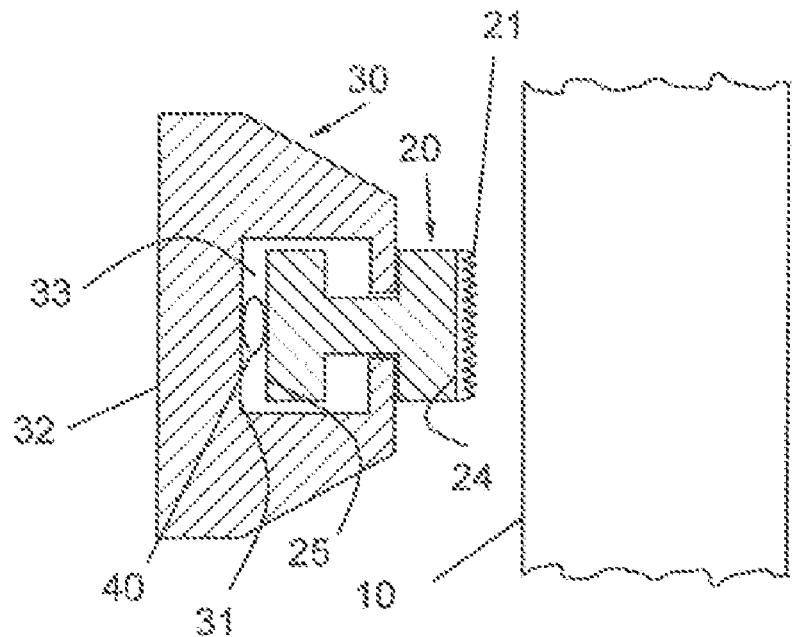
FIG. 3 Cross sectional side view of invention with packing in retracted position.
Figure 4:
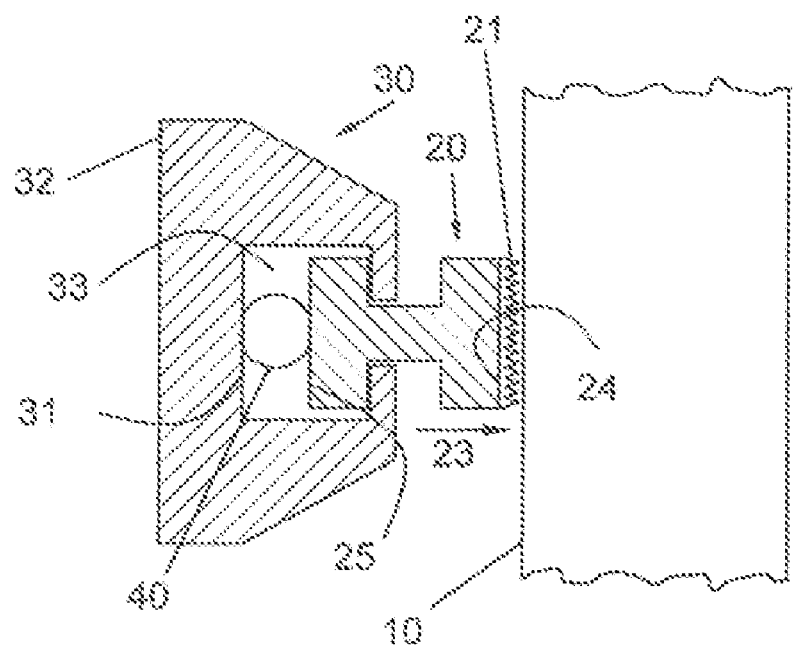
FIG. 4 Cross sectional side view of invention with packing in extended position.
Figure 5:
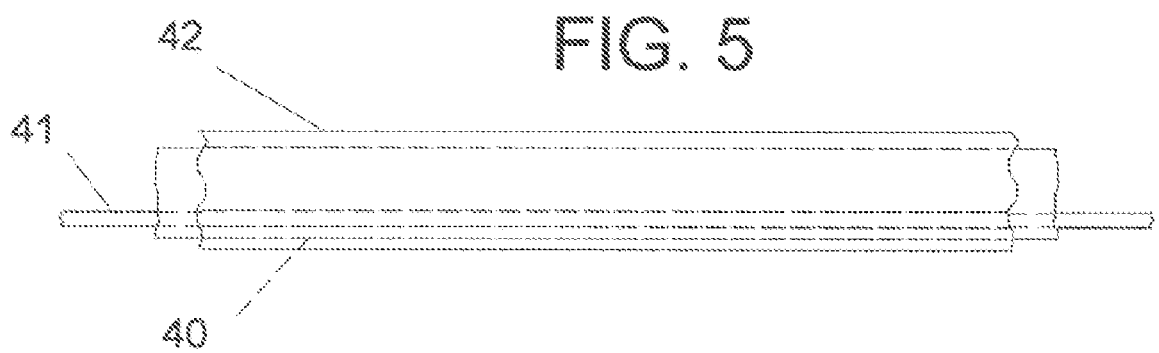
FIG. 5 Fragmented side view of hose, hose sleeve, and hose stabilizer.
Figure 6:
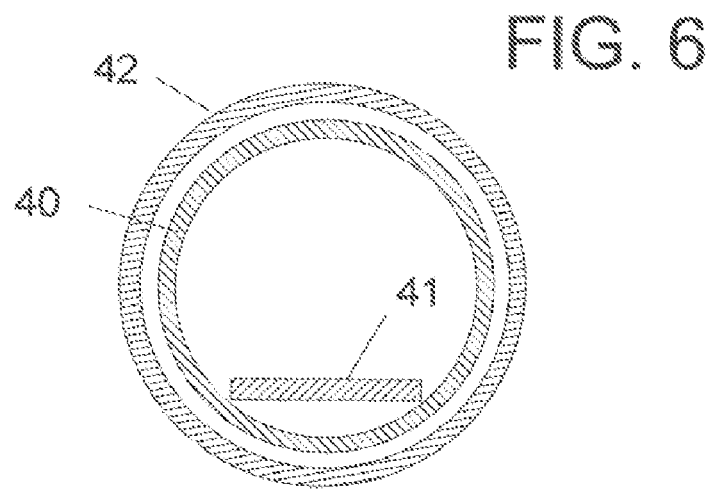
FIG. 6 Cross sectional view of hose, hose sleeve, and hose stabilizer.

The packing 20 is annular, and has outer 25 and inner 24 surfaces and is comprised of segmented portions. The outer surface 25 of the packing is capable of slidingly engaging the channel 33 of the packing holder 30. As depicted in FIGS. 3 & 4, the cross section of packing holder 30 allows for the insertion of the packing 20. It is understood that other cross sections may be used provided the allow for similar slidable engagement. The packing 20 is capable of moving radially with respect to the packing holder 30 between a retracted and an extended position (FIGS. 3 & 4, respectively.)

The packing teeth 21 are fixedly attached to the inner surface 24 of the packing 20. It is understood that each of the segmented portions of the packing has teeth. Therefore the teeth portions are segmented proportional to the packing segments. It will be obvious to those in the art the segments do not have to correspond. Moreover, the teeth do not have to be included for the present invention to work. The purpose of the teeth is to positively affect the fluid flow around the turbine shaft. They are not critical to the use or advantages of the present invention.

A pressurized air supply 50 has an outlet 53. It is understood that pressurized air supplies comprise air compressors. Moreover, it will be obvious to those in the art that fluids other than air can be used provided that the hose 40 expands radially outward upon being filled therewith.

The hose 40 is elongate, flexible, and has a closed end 46 and an open end 45. It is capable of being filled with pressurized fluid so as to expand radially. The hose may be made of any material that allows it to be pressurized with the fluid being used. In a preferred embodiment, a conventional garden hose may be used. Other materials, such as rubber or nylon, may be used. The open end 45 of the hose 40 is in communication with the output 53 of the pressurized air supply 50.

The hose stabilizer 41 is elongate and semi-rigid. It is capable of being inserted into and fitting inside of the hose 40 such that the hose conforms in longitudinal shape to the hose stabilizer. It is understood that the purpose of the stabilizer is to facilitate the insertion of the hose into the cavity 33 of packing holder 30. The rigidity allows the hose to be pushed into the cavity. Typically, the hose is inserted after the packing 20 is inserted into the cavity.

The stabilizer may be made of any material that allows it to be somewhat flexible (so it can be coiled in a serpentine manner—see FIG. 1) yet rigid enough so it can be inserted into the channel 33 and effectively "push" the hose into the channel.

Although preferred, the stabilizer is not necessary. Other methods of insertion can be used. For instance, if the hose itself is of sufficient rigidity it can be pushed into the cavity without the aid of the stabilizer. The hose could also be inserted into the cavity 33 before the packing 20 is inserted into the cavity.

The hose sleeve 42 is elongate and capable of enclosing the hose 40 in a protective manner. Its purpose is to protect the hose. The sleeve may be made of any suitable material such as Kevlar (trademark) or canvas. Although preferred, the sleeve is not necessary. Not using it can cause punctures or premature wear of a hose.

A male-female quick disconnect assembly is used for releasably engaging the open end 45 of the hose 40 to the output 53 of the pressurized air supply 50. It is understood that male-female quick disconnect assembly will be connected between the pneumatic regulator 51 and the open end 45 of the hose 40 when the regulator is used.

In a preferred embodiment, male quick disconnect 43 is securely connected to the open end 45 of the hose 40 and female quick disconnect 44 is securely connected to the regulator 51. It is understood that the quick disconnect is not necessary. The open end 45 of hose 40 can be securely connected to the regulator 51.

The pneumatic regulator 51 is in communication with the outlet 53 of the pressurized air supply and capable of regulating airflow into the hose;

The pressure gage 52 is in communication with the outlet 53 of the pressurized air supply 50 and is capable of detecting and displaying the relative pressure of the hose. This is typically achieved by using a standard threaded connection. As depicted in FIG. 1, the regulator 50 is connected at one end to the output 53 of pressurized air supply 50 and on the other end to the open end 45 of hose 40. The pressure gage 52 is connected to the pneumatic regulator 51.

Although preferred, the regulator and pressure gauge are not necessary. The pressurized air supply 50 could simply be turned on and off as opposed to using a regulator to cease fluid flow. Pressure gage 52 helps assure that the hose is not over pressurized. Open end 45 of hose 40 would then be directly connected to output 53 of pressure source 50. This is typically achieved by using a standard threaded connection.

In operation, the hose 40 is inserted into the channel 33 of the packing holder 30 between the inner surface 31 of the packing holder and the outer surface 25 of the packing. The hose 40 is then inflated and pressurized causing the packing 20 to occupy the extended position. Arrow 23 of FIG. 4 shows the direction of movement of the packing 20 as the hose 40 is pressurized. Thus, the "in operation" mode can be simulated allowing the clearance between the packing and the rotor shaft can be measured.

What is claimed is:
1. A system for facilitating turbine labyrinth packing comprising:
   a packing holder,
      said packing holder being annular, having outer and inner surfaces and being comprised of segmented portions, said packing holder being capable of surrounding a turbine rotor,
said inner surface of said packing holder having a channel;
a packing,
said packing being annular, having outer and inner surfaces and being comprised of segmented portions,
said outer surface of said packing being capable of slidingly engaging said channel of said packing holder,
said packing being capable of moving radially with respect to said packing holder between a retracted and an extended position;
packing teeth being fixedly attached to each of said segmented portions of said inner surface of said packing;
a pressurized air supply having an outlet;
a hose assembly consisting of one flexible pneumatic hose having a first sealed end, a second open end, one exterior surface, and one interior surface that forms an inner-most cavity, one woven fabric sleeve surrounding said exterior surface of said flexible pneumatic hose, and one pliable metal strip within said inner-most cavity of said flexible pneumatic hose;
a male-female quick disconnect assembly for releasably engaging said open end of said hose to said output of said pressurized air supply comprising,
said female portion being securely attached to said output of said pressurized air supply,
said male portion being securely attached to said open end of said hose,
said male and female portions being releasably connected and disconnected to and from each other using a non-threaded, moveable sleeve and compression means;
a pneumatic regulator in communication with said outlet of said pressurized air supply and capable of regulating airflow into said hose;
a pressure gage in communication with said outlet of said pressurized air supply and capable of detecting and displaying the relative pressure of said hose;
whereby said hose assembly may be inserted into said channel of said packing holder between said inner surface of said packing holder and said outer surface of said packing;
further whereby said hose assembly may be inflated and pressurized causing said packing to occupy said extended position.

2. A system for facilitating turbine labyrinth packing comprising:
a packing holder,
said packing holder being annular, having outer and inner surfaces and being comprised of segmented portions,
said packing holder being capable of surrounding a turbine rotor,
said inner surface of said packing holder having a channel;
a packing,
said packing being annular, having outer and inner surfaces and being comprised of segmented portions,
said outer surface of said packing being capable of slidingly engaging said channel of said packing holder,
said packing being capable of moving radially with respect to said packing holder between a retracted and an extended position;
a pressurized air supply having an outlet;
a hose assembly consisting of one flexible pneumatic hose having a first sealed end, a second open end, one exterior surface, and one interior surface that forms an inner-most cavity, one woven fabric sleeve surrounding said exterior surface of said flexible pneumatic hose, and one pliable metal strip within said inner-most cavity of said flexible pneumatic hose;
a male-female quick disconnect assembly for releasably engaging said open end of said hose to said output of said pressurized air supply comprising,
said female portion being securely attached to said output of said pressurized air supply,
said male portion being securely attached to said open end of said hose,
said male and female portions being releasably connected and disconnected to and from each other using a non-threaded, moveable sleeve and compression means;
whereby said hose assembly may be inserted into said channel of said packing holder between said inner surface of said packing holder and said outer surface of said packing;
further whereby said hose assembly may be inflated and pressurized causing said packing to occupy said extended position.

3. The apparatus of claim 2 further comprising:
packing teeth being fixedly attached to each of said segmented portions of said inner surface of said packing.

4. The apparatus of claim 2 further comprising:
a hose sleeve being elongate and capable of enclosing said hose in a protective manner.

5. The apparatus of claim 2 further comprising:
a pneumatic regulator in communication with said outlet of said pressurized air supply and capable of regulating airflow into said hose.

6. The apparatus of claim 2 further comprising:
a pressure gage in communication with said outlet of said pressurized air supply and capable of detecting and displaying the relative pressure of said hose.

7. A method for facilitating turbine labyrinth packing comprising:
providing a system comprising:
a packing holder,
said packing holder being annular, having outer and inner surfaces and being comprised of segmented portions,
said packing holder being capable of surrounding a turbine rotor,
said inner surface of said packing holder having a channel;
a packing,
said packing being annular, having outer and inner surfaces and being comprised of segmented portions,
said outer surface of said packing being capable of slidingly engaging said channel of said packing holder,
said packing being capable of moving radially with respect to said packing holder between a retracted and an extended position;
a pressurized air supply having an outlet;
a hose assembly consisting of one flexible pneumatic hose having a first sealed end, a second open end, one exterior surface, and one interior surface that forms an inner-most cavity, one woven fabric sleeve surrounding said exterior surface of said flexible pneumatic hose, and one pliable metal strip within said inner-most cavity of said flexible pneumatic hose;

a male-female quick disconnect assembly for releasably engaging said open end of said hose to said output of said pressurized air supply comprising,
    said female portion being securedly attached to said output of said pressurized air supply,
    said male portion being securedly attached to said open end of said hose,
    said male and female portions being releasably connected and disconnected to and from each other using a non-threaded, moveable sleeve and compression means;

inserting said hose assembly into said channel of said packing holder between said inner surface of said packing holder and said outer surface of said packing;

inflating and pressurizing said hose assembly so as to cause said hose to expand a force said packing to occupy said extended position;

whereby the operational mode can be simulated allowing for measurements to be taken.

\* \* \* \* \*